US 8,451,526 B2

(12) United States Patent
Chou

(10) Patent No.: US 8,451,526 B2
(45) Date of Patent: May 28, 2013

(54) SHUTTER DEVICE

(75) Inventor: Tai-Hsu Chou, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 390 days.

(21) Appl. No.: 12/853,303

(22) Filed: Aug. 10, 2010

(65) Prior Publication Data

US 2011/0176194 A1   Jul. 21, 2011

(30) Foreign Application Priority Data

Jan. 21, 2010   (TW) .................................. 99101576

(51) Int. Cl.
*G02B 26/02* (2006.01)

(52) U.S. Cl.
USPC .......................................................... 359/230

(58) Field of Classification Search
USPC .................... 359/230; 310/49.22, 266, 268
See application file for complete search history.

(56) References Cited

U.S. PATENT DOCUMENTS 7,560,836 B2 *   7/2009   Yasuda .................... 310/49.22

* cited by examiner

*Primary Examiner* — Euncha Cherry
(74) *Attorney, Agent, or Firm* — Altis Law Group, Inc.

(57) ABSTRACT

An exemplary shutter device includes a base having an aperture defined therein, a shaft mounted on the base, a magnetic element, a shutter blade, a first wire coil and a second wire coil. The magnetic element is connected to the shaft and rotatable around the shaft. The shutter blade is coupled to the shaft and jointly rotatable with the magnetic element. The first wire coil and the second wire coil are mounted on the base arranged on two sides of the magnetic element. The first and second wire coils are configured for driving the magnetic element to rotate, thereby moving the shutter blade to selectively expose the aperture or cover the aperture.

7 Claims, 4 Drawing Sheets

SHUTTER DEVICE

BACKGROUND

1. Technical Field

The present disclosure relates to a shutter device.

2. Description of Related Art

A shutter device allows light to pass through for a determined period of time, for the purpose of exposing photographic film or a light-sensitive electronic sensor to light to capture a permanent image of a scene. Such shutter devices are widely used in electronic devices having a camera function.

Motors such as step motors are usually used in the shutter devices for driving a shutter blade to move. However, the step motor is relatively bulky in volume. In addition, the step motor consumes a substantial amount of power, especially relative to the amount of power that can be stored in a typical battery system of a camera or an electronic device.

What is needed, therefore, is a shutter device which can overcome the above shortcomings.

BRIEF DESCRIPTION OF THE DRAWINGS

Many aspects of the present shutter device can be better understood with reference to the following drawings. The components in the drawings are not necessarily drawn to scale, the emphasis instead being placed upon clearly illustrating the principles of the present shutter device. Moreover, in the drawings, like reference numerals designate corresponding parts throughout the several views.

DETAILED DESCRIPTION

Embodiments of the present portable electronic device will now be described in detail below and with reference to the drawings.

Figure 1:
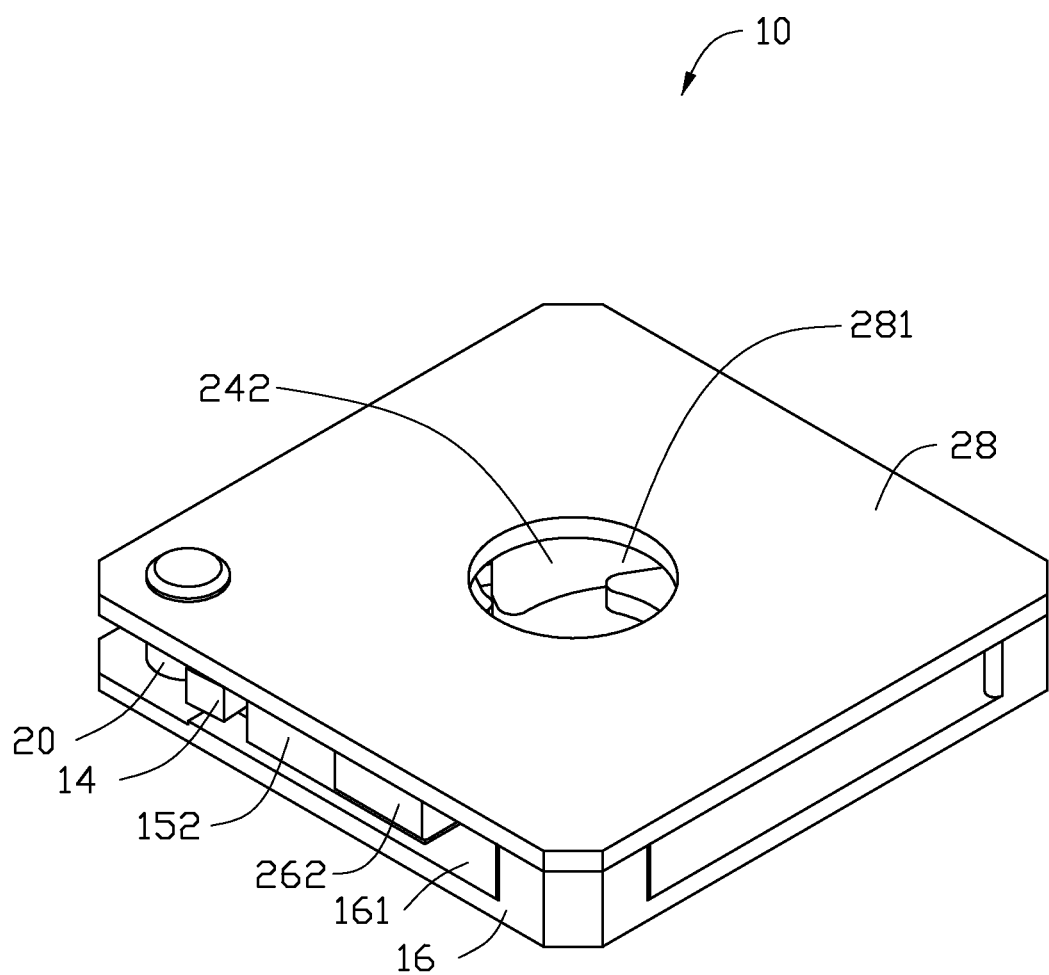
FIG. 1 is a schematic isometric view of a shutter device in accordance with an embodiment.
Figure 2:
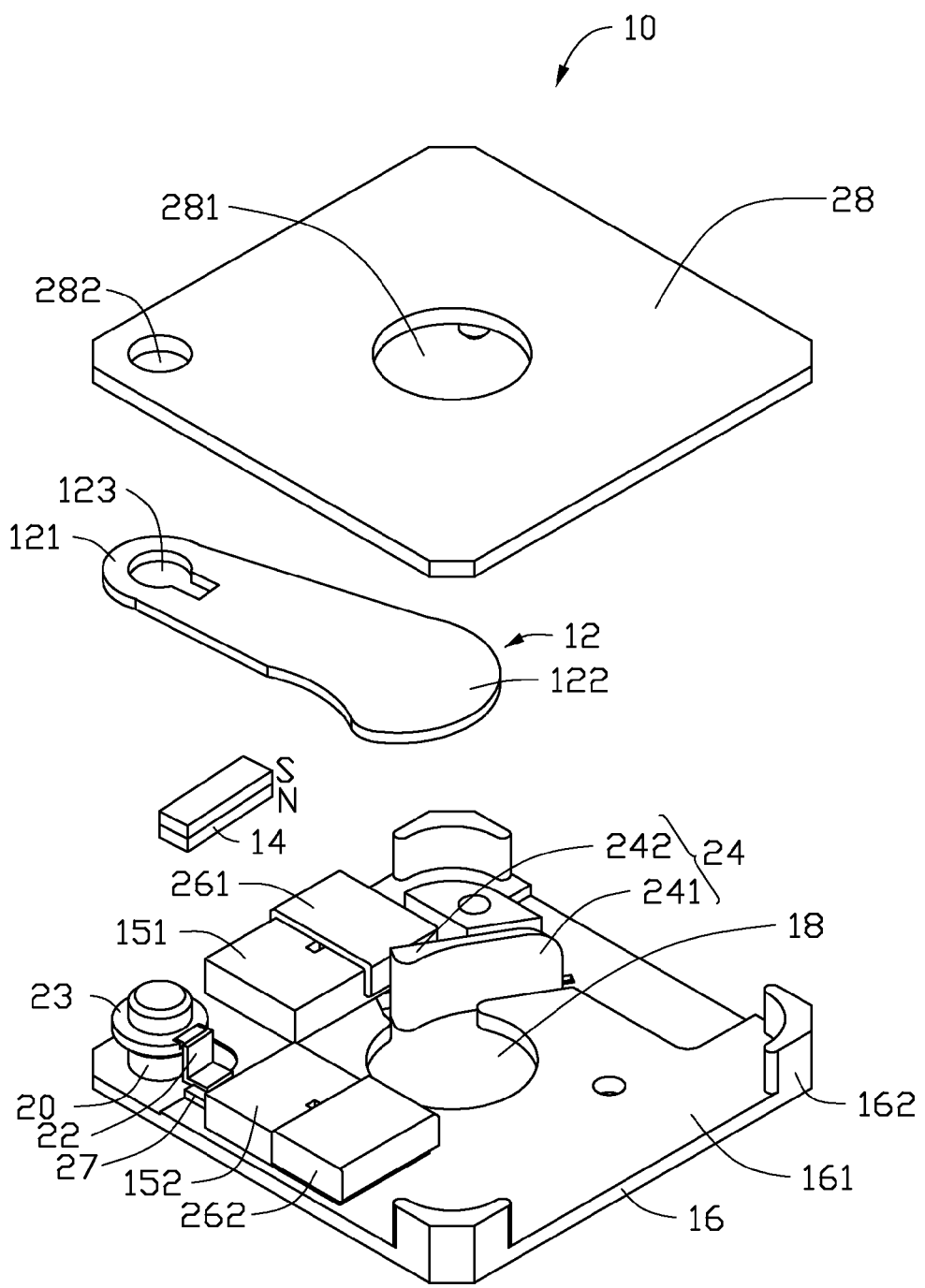
FIG. 2 is a partially exploded view of the shutter device of FIG. 1.

Referring to FIGS. 1 and 2, an exemplary shutter device 10 in accordance with an embodiment, is provided. The shutter device 10 includes a shutter blade 12, a magnetic element 14, a first wire coil 151, a second wire coil 152, a base 16, a shaft 20 and a cover 28. The base 16 has a surface 161, and the shutter blade 12, the magnetic element 14, the first wire coil 151, the second wire coil 152, the shaft 20 and the cover 28 are arranged directly on or above the surface 161.

The base 16 has an aperture 18 formed in a center thereof. In the present embodiment, the base 16 is substantially square-shaped. The base 16 has three protrusions 162 located at three corners thereof, and the shaft 20 is located at the remaining corner of the base 16. The shaft 20 can be fixed on the base 16. The shaft 20 has a ring-shaped pad 23 rotatably mounted thereon, and a Z-shaped tab 22 connected to the ring-shaped pad 23. The Z-shaped tab 22 does not make contact with the surface 161 of the base 16. The magnetic element 14 is mounted on the Z-shaped tab 22, and the magnetic element 14 is a permanent magnet having an (N) magnetic pole and a south (S) magnetic pole arranged on opposite sides thereof. A magnetic field generated by the magnetic element 14 has an N to S direction perpendicular to the surface 161 of the base 16. In the present embodiment, the N pole is on the bottom and the S pole is on the top in reference to the surface 161.

The shutter blade 12 has a first end 121 and a second end 122. The first end 121 is connected to the ring-shaped pad 23 and the Z-shaped tab 22 by an engaging hole 123. The second end 122 is free. An area size of the second end 122 is a little larger than the aperture 18.

The first wire coil 151 and the second wire coil 152 are mounted on the surface 161 of the base, and are arranged on two sides of the magnetic element 14. When the first and second wire coils 151, 152 are have current applied, the first and second wire coils 151, 152 each suffer the magnetic force given by the magnetic element 14, and in response, give a magnetic driving force to the magnetic element 14 together with the ring-shaped pad 23 and the Z-shaped tab 22, which results in the shutter blade 12 movement simultaneity. In particular, the current direction and the time for powering on each of the first and second wire coils 151, 152 can be determined according to movement need of the shutter blade 12.

Figure 4:
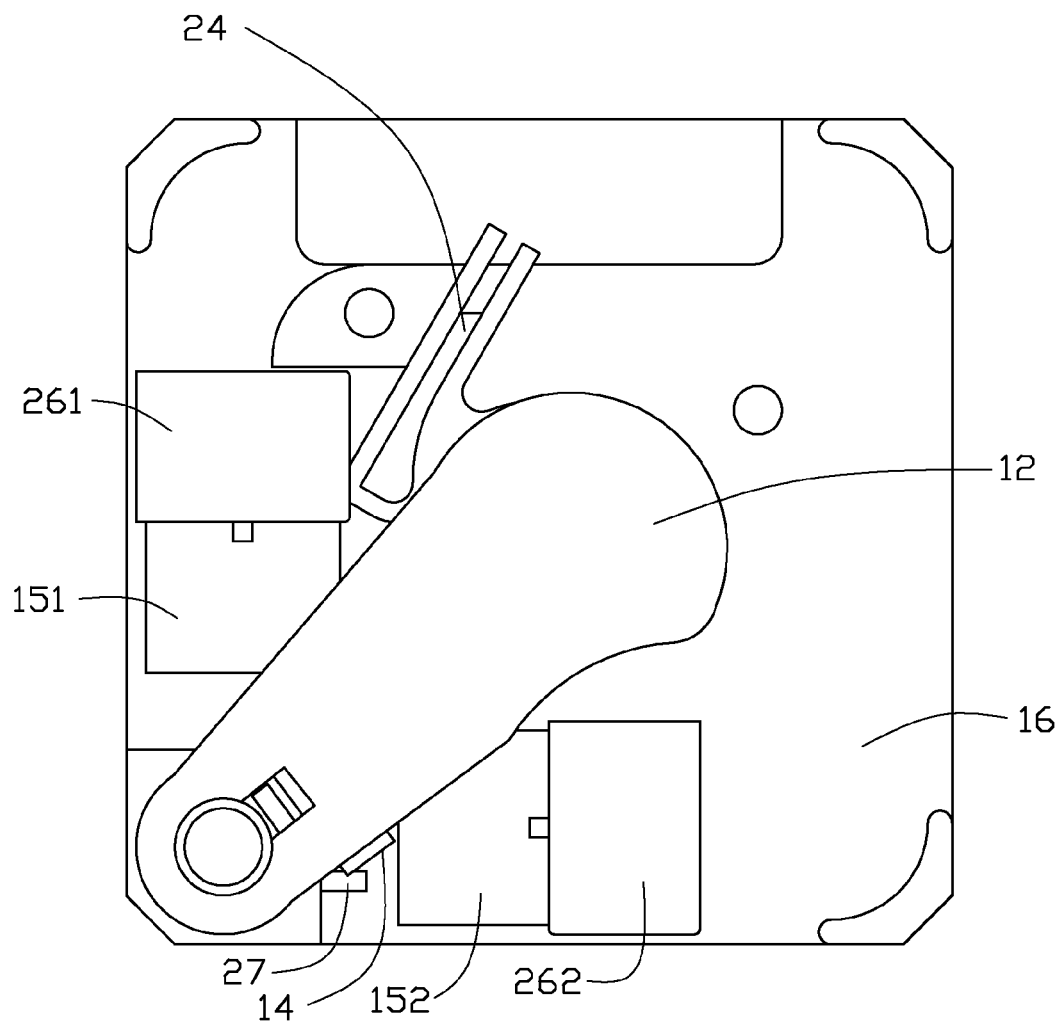
FIG. 4 is similar to FIG. 3, but showing the shutter device in a closed state.

In detail, if the current direction in the first wire coil 151 is the same as that in the second wire coil 152, the shutter blade 12 would cover the aperture 18 (see FIG. 4). For example, if the first and second wire coils 151, 152 are both applied a clockwise current, the second wire coil 152 suffers an Ampere's force pointing to right. As the second wire coil 152 is fixed, and the magnetic element 14 is movable, as such the second wire coil 152 gives a magnetic driving force pointing to left to the magnetic element 14. At the same time, the first wire coil 151 suffers an Ampere's force pointing to left, and in response, gives a magnetic driving force pointing to right to the magnetic element 14. The magnetic driving forces change as the magnetic element 14 moves until they are in balance and the magnetic element 14 stops. At this time, the shutter blade 12 covers the aperture 18. That is, the shutter device 10 is in a closed state.

Figure 3:
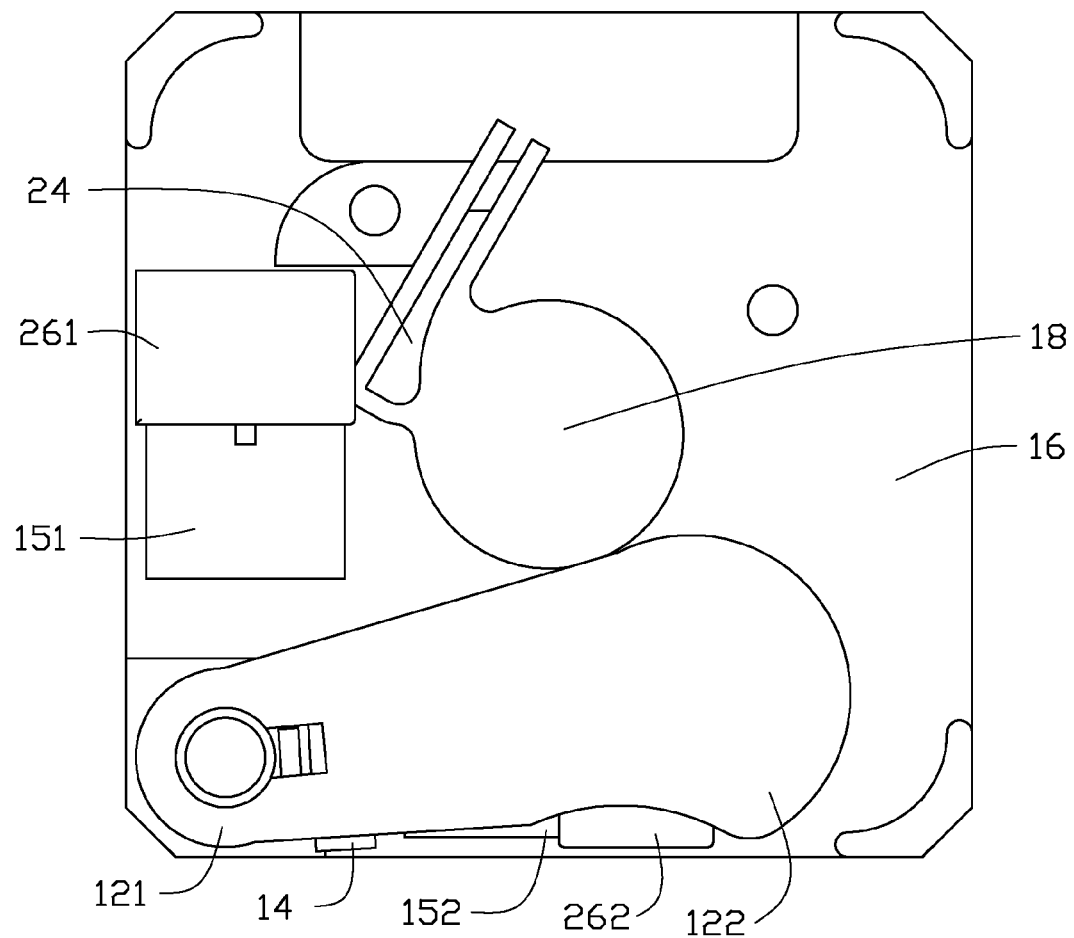
FIG. 3 a planar view showing the shutter device in an exposing state.

At a next time, when an exposing state is needed, the second wire coil 152 can be powered off. Under the magnetic driving force of the first wire coil 151, the magnetic element 14 together with the shutter blade 12 moves to right, and thus exposing the aperture 18 (see FIG. 3). Alternatively, the second wire coil 152 can be powered on, and the first wire coil 151 can be powered off, thus the magnetic element 14 together with the shutter blade 12 can be moved to left, and thereby exposing the aperture 18.

Half of the first wire coil 151 and the second wire coil 152, which are away from the magnetic element 14 do not need to give any magnetic driving force, as such they can be covered by a first electro magnetic interference (EMI) shielding shell 161 and a second EMI shielding shell 162.

The shutter device 10 further includes a buffer 24 arranged near the aperture 18, and a stopping block 27 arranged near the shaft 20. The buffer 24 has an elastic characteristic and has a fixed proximal end 242 and a free distal end 241. The buffer 24 is configured to prevent over movement of the shutter blade 12 without vibration of the shutter blade 12. The stopping block 27 is configured to avoid over movement of the magnetic element 14.

With the above configuration, the shutter blade 12 can be moved by the cooperation of the first and second wire coils 151, 152. The entire shutter device is compact, and can be used in camera modules in electronic devices.

The cover 28 has an aperture (through hole) 281 and an engaging hole 282 defined therein. The engaging hole 282 is engaged with the shaft 20, and the cover 28 is supported by the protrusions 162. The aperture 281 allows light incident to the shutter blade 12.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A shutter device comprising:
   a base having an aperture defined therein;
   a shaft fixedly mounted on the base;
   a magnetic element connected to the shaft and rotatable around the shaft;
   a shutter blade coupled to the shaft and jointly rotatable with the magnetic element;
   a first wire coil and a second wire coil mounted on the base arranged on two sides of the magnetic element, the first and second wire coils configured for driving the magnetic element to rotate, thereby moving the shutter blade to selectively expose the aperture or cover the aperture;
   a first electro magnetic interference shielding shell covering a half portion of the first wire coil at an opposite side thereof to the magnetic element; and
   a second electro magnetic interference shielding shell covering a half portion of the second wire coil at an opposite side thereof to the magnetic element.

2. The shutter device of claim 1, wherein the base is square, the shaft is mounted on one corner of the base and the first wire coil and second wire coil are arranged on two sides of the base around the corner.

3. The shutter device of claim 2, further comprising a ring-shaped pad rotatably mounted to the shaft and a Z-shaped tab connected to the ring-shaped pad, the magnetic element is mounted on the Z-shaped tab and the shutter blade having a first end connected to both the first ring-shaped pad and the Z-shaped tab, and a free second end for exposing or covering the aperture.

4. The shutter device of claim 1, further comprising an elastic buffer arranged adjacent to the aperture, the buffer having a free distal end configured for blocking movement of the shutter blade.

5. The shutter device of claim 1, wherein a magnetic field direction of the magnetic element is perpendicular to the base.

6. The shutter device of claim 1, further comprising a cover having a through hole and an engaging hole defined therein, the through hole aligned with the aperture, the engaging hole engaged with the shaft.

7. The shutter device of claim 6, wherein the base has a plurality of protrusions defined thereon, the protrusions and the shaft cooperatively supporting the cover.

\* \* \* \* \*